(12) United States Patent
Yamamoto (10) Patent No.: US 9,613,597 B2
(45) Date of Patent: Apr. 4, 2017

(54) APPARATUS AND METHOD FOR IMAGE COMPOSITING BASED ON DETECTED PRESENCE OR ABSENCE OF BASE IMAGE

(71) Applicant: Masatsugu Yamamoto, Tokyo (JP)

(72) Inventor: Masatsugu Yamamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 106 days.

(21) Appl. No.: 13/720,619

(22) Filed: Dec. 19, 2012

(65) Prior Publication Data
US 2013/0235059 A1     Sep. 12, 2013

(30) Foreign Application Priority Data

Mar. 8, 2012 (JP) ................... 2012-051291

(51) Int. Cl.
| | |
|---|---|
| *G09G 5/14* | (2006.01) |
| *G09G 5/377* | (2006.01) |
| *H04N 9/75* | (2006.01) |
| *G09G 5/18* | (2006.01) |
| *G09G 5/02* | (2006.01) |

(52) U.S. Cl.
CPC .............. *G09G 5/377* (2013.01); *G09G 5/14* (2013.01); *G09G 5/18* (2013.01); *H04N 9/75* (2013.01); *G09G 5/026* (2013.01); *G09G 2340/0407* (2013.01); *G09G 2340/0435* (2013.01); *G09G 2340/12* (2013.01); *G09G 2370/20* (2013.01)

(58) Field of Classification Search
None
See application file for complete search history.

(56) References Cited

U.S. PATENT DOCUMENTS

| | | | | |
|---|---|---|---|---|
| 4,827,344 A | * | 5/1989 | Astle ...................... | H04N 5/272 348/586 |
| 5,241,371 A | * | 8/1993 | Fukushima ............ | H04N 5/272 348/578 |

(Continued)

FOREIGN PATENT DOCUMENTS

| | | |
|---|---|---|
| JP | 5-207368 A | 8/1993 |
| JP | 2000-221960 A | 8/2000 |

(Continued)

*Primary Examiner* — Barry Drennan
*Assistant Examiner* — Diana Hickey
(74) *Attorney, Agent, or Firm* — Birch, Stewart, Kolasch & Birch, LLP (57) ABSTRACT

An image compositing apparatus of the present invention includes first overlay image processing circuitry that stores the position and size of an area in which a first overlay image is displayed and, according thereto, changes the position and size of the first overlay image, second overlay image processing circuitry that processes a second overlay image similarly to the first overlay image processing circuitry, a circuit for detecting the absence of base image that decides the presence or absence of a base image, and a chromakey decision circuitry that decides a chromakey color portion of the base image. In a case where the circuit for detecting the absence of base image decides the absence of a base image, the image compositing apparatus outputs the first and second overlay images processed by the first overlay image processing circuitry and the second overlay image processing circuitry, respectively.

8 Claims, 4 Drawing Sheets

(56) References Cited

U.S. PATENT DOCUMENTS

2009/0040385 A1\* 2/2009 Staker .................. H04N 9/75
 348/584
2010/0066762 A1 3/2010 Yeh et al.

FOREIGN PATENT DOCUMENTS

| JP | 2002-271692 A | 9/2002 |
| JP | 2004-355391 A | 12/2004 |
| JP | 2006-129401 A | 5/2006 |
| JP | 2006-222694 A | 8/2006 |
| JP | 2007-206428 A | 8/2007 |

\* cited by examiner

APPARATUS AND METHOD FOR IMAGE COMPOSITING BASED ON DETECTED PRESENCE OR ABSENCE OF BASE IMAGE

BACKGROUND OF THE INVENTION

Field of the Invention

The present invention relates to an image compositing apparatus, and more particularly, to an image compositing apparatus that superimposes an overlay image on an area of chromakey color on a base image and outputs as a composite image.

Description of the Background Art

There is known an image compositing technique of such a system (referred to as chromakey overlay system) that an image area of a specific color, that is, chromakey color, is drawn on a base image, and an overlay image is subjected to image processing, such as being partially cut out and scaled up or down in accordance with the size and position of the image area for an overlay image, to thereby overlay the overlay image on the image area with the use of chromakey (for example, Japanese Patent Application Laid-Open No. 05-207368 (1993), pp 3 to 5, FIG. 1).

In this case, a part of the base image is set in a chromakey color for overlay, and an overlay image is displayed for pixels in a portion of chromakey color and the base image is displayed per se for pixels in a portion of a color that does not match the chromakey color.

There is known another image compositing technique in such a system (hardware overlay system) that in a case of displaying a plurality of overlay images on a base image, overlay is performed in a display priority order determined in advance for a portion in which the plurality of overlay images are superimposed on each other (for example, Japanese Patent Application Laid-Open No. 2004-355391, pp 3 to 7, FIG. 1).

As a conventional image compositing apparatus obtained by combining the above-mentioned two techniques, there is an image compositing apparatus that overlays and displays a plurality of images in appropriate sizes at appropriate positions on a base image, where the base image is a PC desktop.

This image compositing apparatus creates a composite overlay image obtained by compositing a plurality of overlay images by a hardware overlay system, and thereafter, in a case of compositing the composite overlay image and a base image, composites those images by a chromakey overlay system.

The chromakey color is selected so as not to match the color of a mouse cursor of a PC, and thus, the mouse cursor does not disappear even if the mouse cursor is superimposed on a composite overlay image.

The portion in which a plurality of overlay images are superimposed on each other is composited by the hardware overlay system, which enables to display the plurality of overlay images superimposed in a desired priority order.

The image compositing apparatus obtained by combining the above-mentioned two techniques uses a chromakey overlay system for compositing an overlay image on a base image. For this reason, in a case where there is no signal of the base image, not only the base image cannot be displayed, but also all overlay images cannot be displayed.

If a base image and all overlay images are not displayed in an image compositing apparatus aimed for providing a user with the base image and overlay images as information, an intended function is lost completely. In this respect, a conventional image compositing apparatus has a significant risk in operation.

SUMMARY OF THE INVENTION

An object of the present invention is to provide an image compositing apparatus capable of continuously outputting overlay images even in a case where there is no signal of a base image that includes an area of chromakey color for compositing an overlay image.

A multi-screen display according to the present invention is an image compositing apparatus that superimposes an overlay image on an area of chromakey color on a base image and outputs the overlay image as a composite image. The multi-screen display according to the present invention includes a storage unit that stores the position and size of an area in which the overlay image is displayed, and an image position and size change unit that changes the position and size of the overlay image in accordance with the information of the storage unit. In addition, the multi-screen display according to the present invention includes a base image presence or absence decision unit that decides the presence or absence of the base image, and a chromakey decision unit that decides a chromakey color portion of the base image. The multi-screen display according to the present invention outputs the overlay image having the position and size changed by the image position and size change unit in a case where the base image presence or absence decision unit decides the presence of a base image and the chromakey decision unit decides that the portion of the base image is the chromakey color portion. The multi-screen display according to the present invention outputs the base image in a case where the base image presence or absence decision unit decides the presence of a base image and the chromakey decision unit decides that the portion of the base image is not the chromakey color portion. The multi-screen display according to the present invention outputs the overlay image having the position and size changed by the image position and size change unit in a case where the base image presence or absence decision unit decides the absence of a base image.

According to the present invention, even in a case where the base image presence or absence decision unit decides the absence of a base image, the image compositing apparatus outputs an overlay image having the position and size changed by the image position and size change unit. This enables to continuously output overlay images even in a case where there is no base image signal due to, for example, an equipment failure.

These and other objects, features, aspects, and advantages of the present invention will become more apparent from the following detailed description of the present invention when taken in conjunction with the accompanying drawings.

DESCRIPTION OF THE PREFERRED EMBODIMENT

Overall configuration

Figure 1:
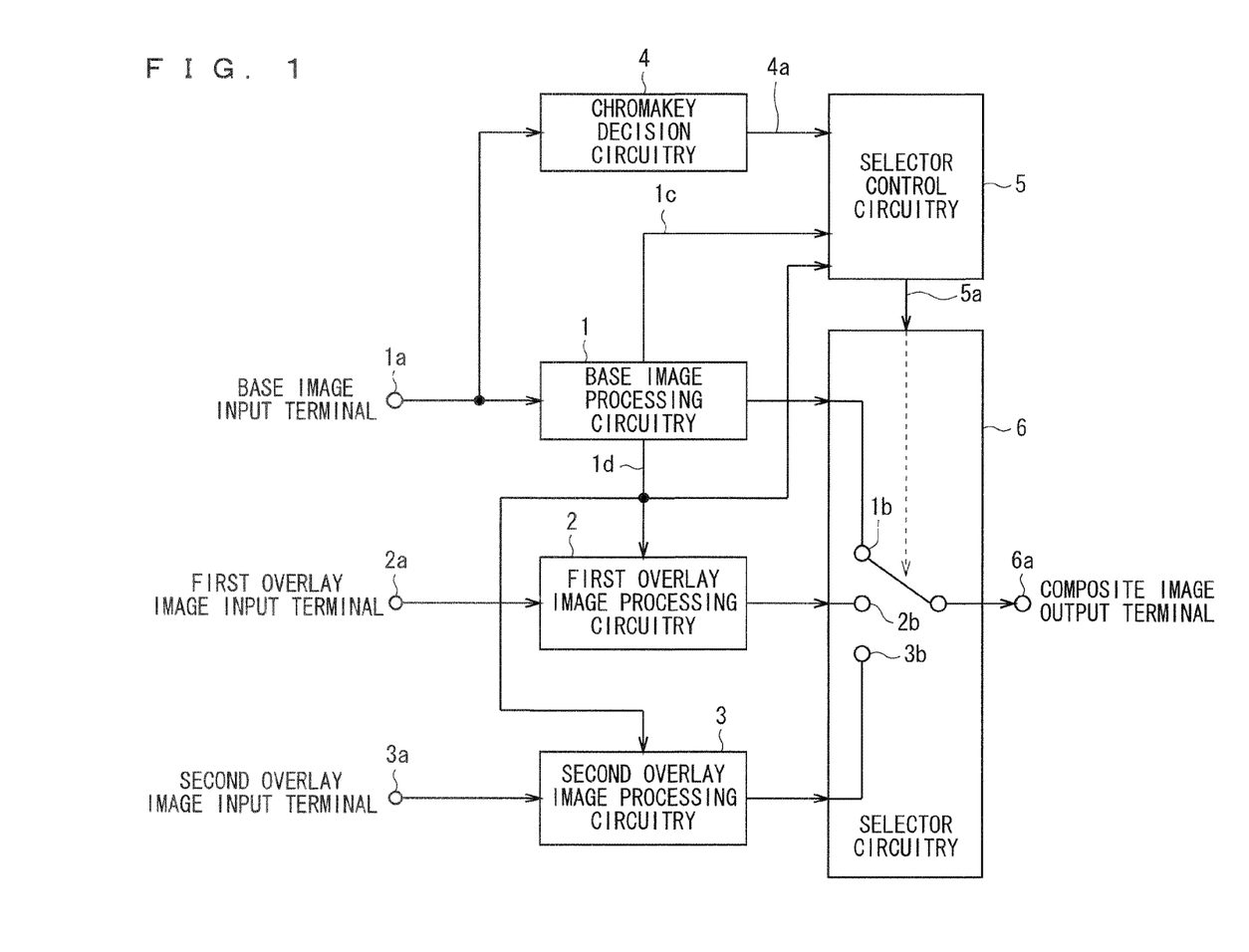
FIG. 1 shows a circuit configuration of an image compositing apparatus according to a preferred embodiment of the present invention.

FIG. 1 shows the circuit configuration of an image compositing apparatus according to a preferred embodiment of the present invention. FIGS. 2A, 2B, 2C, 2D, 2E, and 2F show examples of a base image, overlay images, and the like. The image compositing apparatus according to this preferred embodiment superimposes an overlay image on an area of chromakey color on a base image 7 (FIG. 2A), which is input as a base image signal from a base image input terminal 1a, and outputs a composite image to a composite image output terminal 6a.

The area of chromakey color is composed of, for example, a first window area 8 and a second window area 9. A first overlay image (FIG. 2B) input from a first overlay image input terminal 2a is superimposed on the first window area 8 through scaling-up or scaling-down into a predetermined size, and a second overlay image (FIG. 2C) input from a second overlay image input terminal 3a is superimposed on the second window area 9 through scaling-up or scaling-down into a predetermined size, whereby a composite image (FIG. 2D) is obtained. The composite image is output to, for example, a display device (not shown) such as a PC display.

As described below, the image compositing apparatus according to this preferred embodiment outputs at least a first overlay image and a second overlay image scaled up or down into a predetermined size even in a case where there is no base image signal due to, for example, an equipment failure.

Figure 2A:
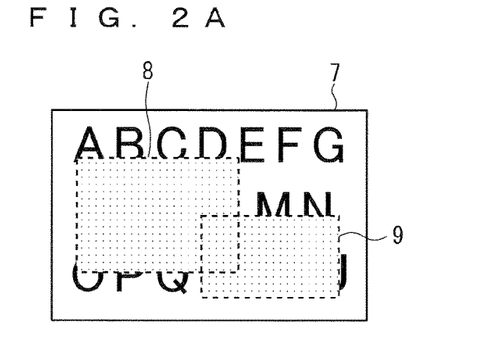
FIGS. 2A, 2B, 2C, 2D, 2E, and 2F show examples of a base image and the like according to the preferred embodiment of the present invention.
Figure 2B:
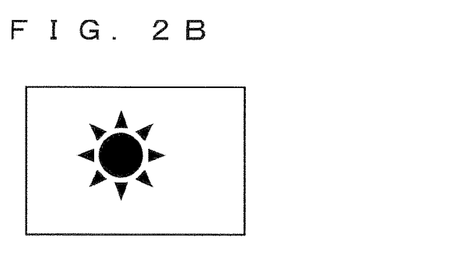
Figure 2C:
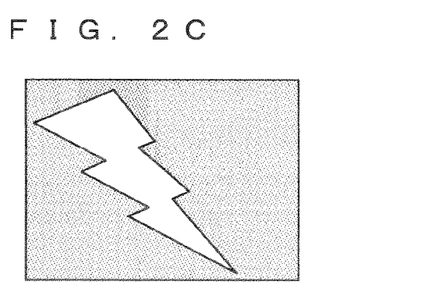

The base image shown as an example in FIG. 2A is, for example, an image on a PC desktop, and a dashed line in FIG. 2A is provided for indicating each window area, which is not drawn in an actual base image.

As shown in FIG. 1, the image compositing apparatus according to this preferred embodiment includes chromakey decision circuitry 4 as a chromakey decision unit that decides a portion of chromakey color on a base image, base image processing circuitry 1 that processes a base image and outputs a predetermined signal, an overlay image processing part, selector circuitry 6 that selects an image signal to output, and selector control circuitry 5 that controls the selector circuitry 6.

The overlay image processing part is composed of first overlay image processing circuitry 2 that processes a first overlay image and second overlay image processing circuitry 3 that processes a second overlay image.

<Configuration of Base Image Processing Circuitry>

Figure 3:
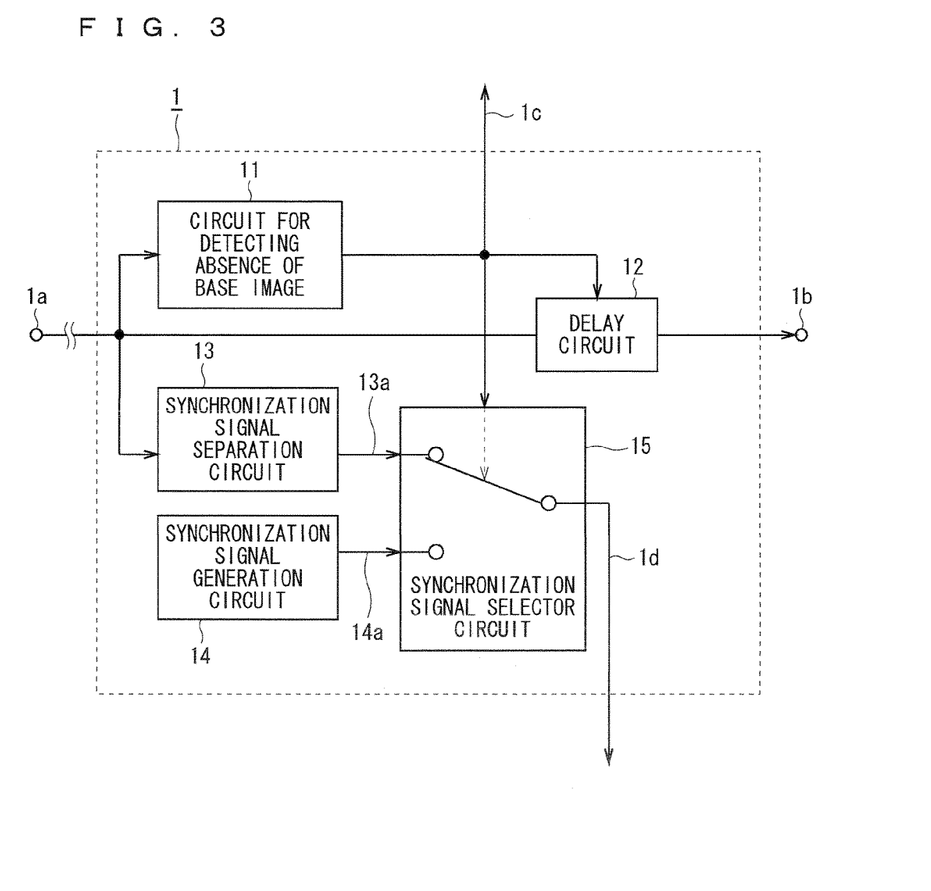
FIG. 3 shows the configuration of a base image processing circuit according to the preferred embodiment of the present invention.

FIG. 3 shows the configuration of the base image processing circuitry 1. The base image processing circuitry 1 includes a circuit for detecting the absence of base image 11 as a base image presence or absence decision unit that decides the presence or absence of a base image, a delay circuit 12 that delays the received base image signal, and a synchronization signal circuit part.

The synchronization signal circuit part includes a synchronization signal separation circuit 13 that separates a video synchronization signal from the base image signal and outputs the video synchronization signal as a first video synchronization signal 13a, a synchronization signal generation circuit 14 that outputs a second video synchronization signal prepared in advance, and a synchronization signal selector circuit 15 that selects any one of the first video synchronization signal 13a and the second video synchronization signal 14a based on a signal without base image 1c and outputs the selected one as a video synchronization signal 1d.

<Configuration of First Overlay Image Processing Circuitry>

Figure 4:
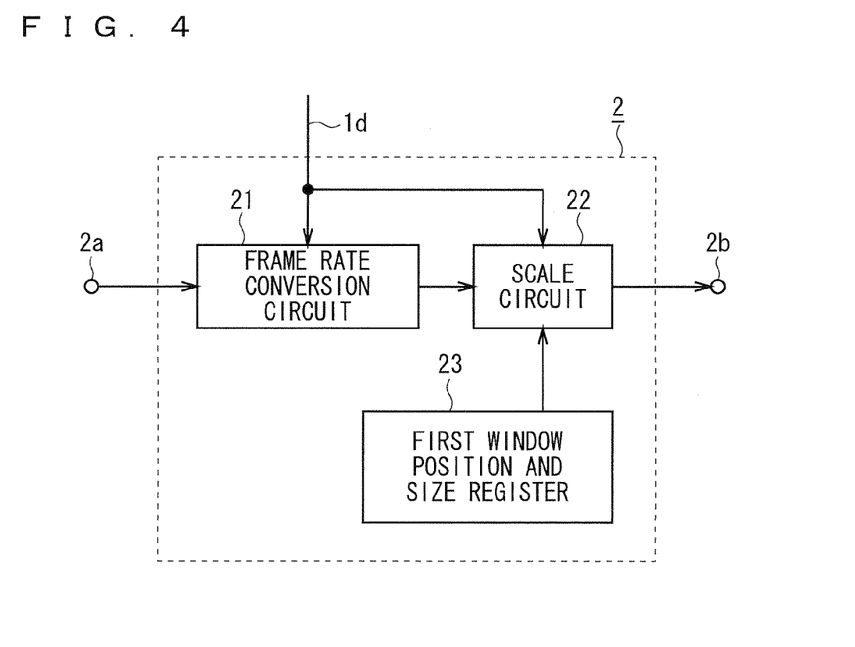
FIG. 4 shows the configuration of a first overlay image processing circuit according to the preferred embodiment of the present invention.

FIG. 4 shows the configuration of the first overlay image processing circuitry 2. The first overlay image processing circuitry 2 includes a frame rate conversion circuit 21 that converts a frame rate of a first overlay image in synchronization with the video synchronization signal 1d, a first window position and size register 23 as a storage unit that stores an area in which the first overlay image is displayed, that is, the position and size of the first window area 8, and a scale circuit 22 as an image position and size change unit that changes the position and size of the first overlay image in accordance with the information of the first window position and size register 23.

Similarly to the first overlay image processing circuitry 2, the second overlay image processing circuitry 3 includes a frame rate conversion circuit, a scale circuit, and a second window position and size register. Here, the second window position and size register stores the position and size of the second window area 9.

<Configuration of Selector Control Circuitry>

Figure 5:
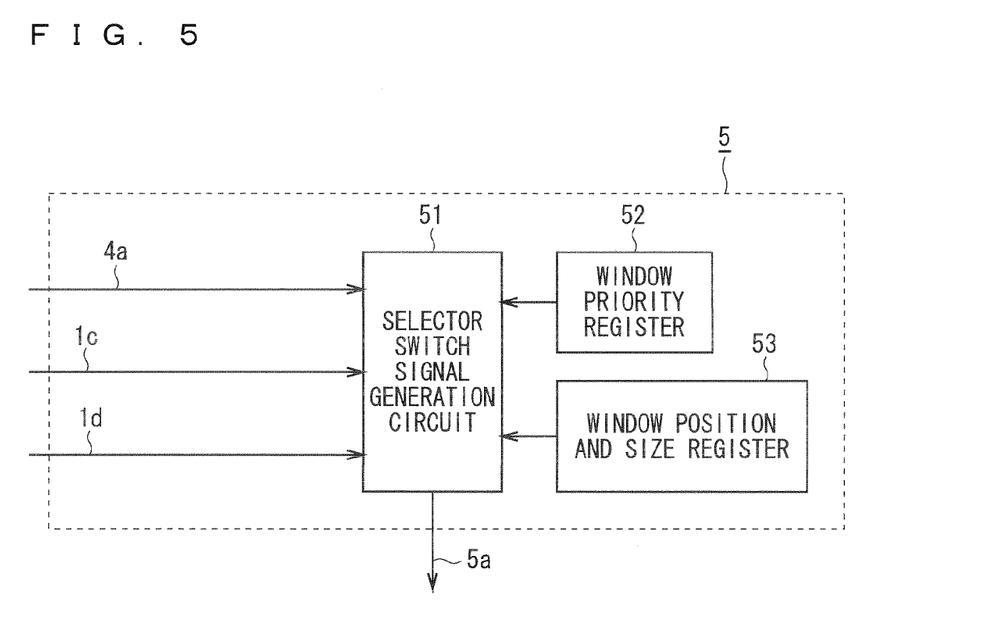
FIG. 5 shows the configuration of a selector control circuit according to the preferred embodiment of the present invention.

FIG. 5 shows the configuration of the selector control circuitry 5. The selector control circuitry 5 includes a selector switch signal generation circuit 51 that generates a selector switch signal 5a for switching the selector circuitry 6, a window priority register 52 that stores the priority information of windows, and a window position and size register 53 as a storage unit that stores the positions and sizes of the areas (that is, first window area 8 and second window area 9) in which overlay images are displayed. Here, the priority information indicates that an overlay image of which one of a plurality of window areas is to be displayed preferentially.

<Operation of Base Image Processing Circuitry>

A base image signal input from the base image input terminal 1a is supplied to each of the circuit for detecting the absence of base image 11, the delay circuit 12, and the synchronization signal separation circuit 13. The circuit for detecting the absence of base image 11 decides the presence or absence of a base image and outputs the decision result as the signal without base image 1c to the delay circuit 12, the synchronization signal selector circuit 15, and the selector control circuitry 5.

The delay circuit 12 delays the base image signal for a predetermined period of time and then outputs the base image signal to a base image output terminal 1b. This delay is one in which a delay of a signal in the chromakey decision circuitry 4 and a delay of a signal in the selector control circuitry 5 are taken into consideration. Through this delay, the selector circuit 6 can switch selection and non-selection of the base image output terminal 1b at an appropriate timing.

The delay circuit 12 is supplied with the signal without base image 1c, and outputs a background image 7a pre-stored in the delay circuit 12 to the base image output terminal 1b in place of a base image in a case where the signal without base image 1c indicates the absence of a base image. FIG. 2E shows an example of the composite image in this case.

The synchronization signal separation circuit 13 separates the video synchronization signal from the base image signal and outputs the video synchronization signal to the synchronization signal selector circuit 15 as the first video synchronization signal 13a. The synchronization signal generation circuit 14 outputs a video synchronization signal prepared in advance to the synchronization signal selector circuit 15 as the second video synchronization signal 14a.

The synchronization signal selector circuit 15 selects the first video synchronization signal 13a or the second video synchronization signal 14a based on the signal without base image 1c. In other words, the synchronization signal selector circuit 15 selects the first video synchronization signal 13a in a case where the signal without base image 1c indicates the presence of a base image and outputs the second video synchronization signal 14a in a case where the signal without base image 1c indicates the absence of a base image, to thereby output the selected signal as the video synchronization signal 1d to the first overlay processing circuitry 2, the second overlay processing circuitry 3, and the selector control circuitry 5.

<Operation of First Overlay Image Processing Circuitry>

The first overlay image signal is input to the frame rate conversion circuit 21 from the first overlay image signal input terminal 2a. Then, the frame rate conversion circuit 21 converts the frame rate of the first overlay image signal in synchronization with the video synchronization signal 1d, and then outputs the first overlay image signal to a scale circuit 22. The scale circuit 22 cuts out a predetermined portion of the first overlay image in accordance with the information of the first window position and size register 23, scales up or down the cut out portion into a predetermined size, and outputs the cut out portion to a first overlay image output terminal 2b. Here, the timing of output to the first overlay image output terminal 2b is determined in accordance with the video synchronization signal 1d.

The second overlay image processing circuitry 3 processes a second overlay image signal input from the second overlay image input terminal 3a similarly to the first overlay image processing circuitry 2, and outputs the second overlay image signal to a second overlay image output terminal 3b.

<Operation of Chromakey Decision Circuitry>

The chromakey decision circuitry 4 detects a portion of chromakey color on the base image from the base image signal input from the base image input terminal 1a, and outputs a chromakey signal 4a indicating an area of chromakey color to the selector control circuitry 5.

<Operations of Selector Control Circuitry and Selector Circuitry>

The selector control circuitry 5 is supplied with the chromakey signal 4a, the signal without base image 1c, and the video synchronization signal 1d. The selector switch signal generation circuit 51 generates the selector switch signal 5a with reference to the information of the window priority register 52 and the window position and size register 53 in response to those signals, and outputs the selector switch signal 5a to the selector circuitry 6.

The selector circuitry 6 outputs a composite image signal to the composite image output terminal 6a while selecting any one of the base image output terminal 1b, the first overlay image output terminal 2b, and the second overlay image output terminal 3b in response to the selector switch signal 5a.

Hereinbelow, descriptions are individually given of the operations of the selector control circuitry 5 in a case where the signal without base image 1c indicates the presence of a base image and in a case where the signal without base image 1c indicates the absence of a base image.

<Case where there is Base Image Signal>

In a case where the signal without base image 1c indicates the presence of a base image, that is, in a case where there is a base image signal, the selector control circuitry 5 performs control with reference to the chromakey signal 4a, with the use of the first synchronization signal 13a separated from the base image signal as the video synchronization signal 1d.

In a case where the chromakey signal 4a indicates a portion of chromakey color, if an area determined based on the video synchronization signal 1d is an area in which two windows are superimposed on each other, that is, an area in which the first window area 8 and the second window area 9 are superimposed on each other, the selector control circuitry 5 refers to the window priority register 52 and outputs the selector switch signal 5a such that the selector circuitry 6 selects an overlay image output terminal of an overlay image having higher priority. If an area determined based on the video synchronization signal 1d is the first window area 8 and is not the area in which the two windows are superimposed on each other, the selector control circuitry 5 outputs the selector switch signal 5a such that the selector circuitry 6 selects the first overlay image output terminal 2b. If an area determined based on the video synchronization signal 1d is the second window area 9 and is not an area in which two windows are superimposed on each other, the selector control circuitry 5 outputs the selector switch signal 5a such that the selector circuitry 6 selects the second overlay image output terminal 3b.

Meanwhile, in a case where the chromakey signal 4a does not indicate a portion of chromakey color, the selector control circuitry 5 outputs the selector switch signal 5a such that the selector circuitry 6 selects the base image output terminal 1b.

Figure 2D:
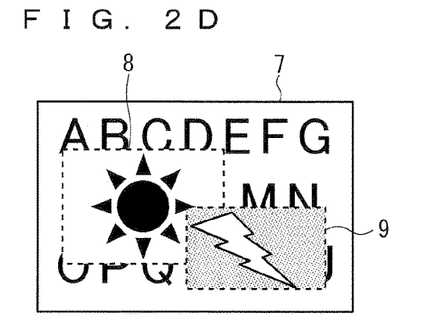
Figure 2E:
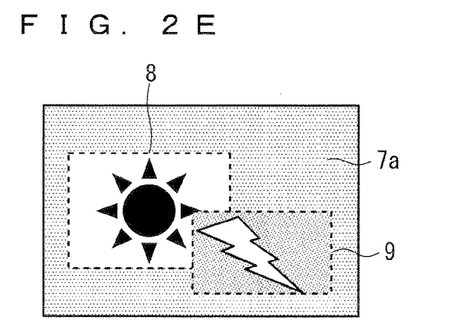

The selector circuitry 6 is controlled as described above, whereby a composite image is output from the composite image output terminal 6a (for example, FIG. 2D). In the example of this composite image, higher priority is set in the second overlay image than the first overlay image, and accordingly, the second overlay image is displayed in the area in which two windows are superimposed on each other.

<Case where there is No Base Image Signal>

In a case where the signal without base image 1c indicates the absence of a base image, that is, in a case where there is no base image signal, the selector control circuitry 5 uses, as the video synchronization signal 1d, the second video synchronization signal 14a, which is output from the synchronization signal generation circuit 14 and is prepared in advance, to control the selector circuitry 6.

The selector control circuitry 5 outputs the selector switch signal 5a to the area determined based on the video synchronization signal 1d, with reference to the information of the window position and size register 53. In other words, if an area determined based on the video synchronization signal 1d is an area in which two windows are superimposed on each other, that is, an area in which the first window area 8 and the second window area 9 are superimposed on each other, the selector control circuitry 5 refers to the window priority register 52 and outputs the selector switch signal 5a such that the selector circuitry 6 selects an overlay image output terminal of an overlay image having higher priority.

If an area determined based on the video synchronization signal 1*d* is the first window area 8 and is not an area in which two windows are superimposed on each other, the selector control circuitry 5 outputs the selector switch signal 5*a* such that the selector circuitry 6 selects the first overlay image output terminal 2*b*.

If an area determined based on the video synchronization signal 1*d* is the second window area 9 and is not an area in which two windows are superimposed on each other, the selector control circuitry 5 outputs the selector switch signal 5*a* such that the selector circuitry 6 selects the second overlay image output terminal 3*b*.

If an area determined based on the video synchronization signal 1*d* is not the first window area 8 neither the second window area 9, the selector control circuitry 5 outputs the selector switch signal 5*a* such that the selector circuitry 6 selects the base image output terminal 1*b*.

The selector circuitry 6 is controlled as described above, whereby a composite image signal is output from the composite image output terminal 6*a*. FIG. 2E shows an example of the composite image in a case of no base image signal. In this preferred embodiment, in a case where there is no base image signal, the delay circuit 12 outputs the background image 7*a* prepared in advance to the base image output terminal 1*b* in place of the base image 7. Accordingly, as shown in FIG. 2E, the background image 7*a* is displayed as the background of the overlay image also in a case where there is no base image 7.

Figure 2F:
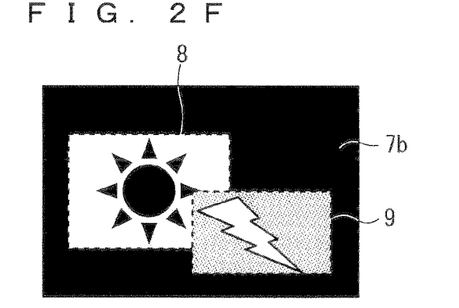

Meanwhile, in a case where the delay circuit 12 does not output the background image 7*a*, as shown in FIG. 2F, only an overlay image is output and, for example, an image such as a black raster image 7*b* is displayed as the background of the overlay image.

While two systems of overlay images are provided in this preferred embodiment, the number of overlay images is not necessarily limited to two systems, which may be appropriate number.

<Effects>

The image compositing apparatus according to this preferred embodiment is an image compositing apparatus that superimposes an overlay image on an area of chromakey color on the base image 7 and outputs the overlay image as a composite image. The image compositing apparatus includes a storage unit that stores the position and size of an area in which the overlay image is displayed, an image position and size change unit that changes the position and size of the overlay image in accordance with the information of the storage unit, a base image presence or absence decision unit that decides the presence or absence of the base image 7, and a chromakey decision unit that decides a chromakey color portion of the base image 7. The image compositing apparatus outputs the overlay image having the position and size changed by the image position and size change unit in a case where the base image presence or absence decision unit decides the portion of the presence of a base image and the chromakey decision unit decides that the portion of the base image is a chromakey color portion, outputs the base image 7 in a case where the base image presence or absence decision unit decides the presence of a base image and the chromakey decision unit decides that the portion of the base image is not the chromakey color portion, and outputs the overlay image having the position and size changed by the image position and size change unit in a case where the base image presence or absence decision unit decides the absence of a base image.

Accordingly, even in a case where the base image presence or absence decision unit decides the absence of a base image, the image compositing apparatus outputs an overlay image having the position and size changed by the image position and size change unit. This enables to continuously output overlay images even in a case where there is no base image signal due to, for example, an equipment failure.

Further, in a case where the base image presence or absence decision unit decides the absence of a base image, the image compositing apparatus according to this preferred embodiment uses the second video synchronization signal 14*a* prepared in advance in place of the first video synchronization signal 13*a* obtained from the signal of the base image to output an overlay image.

Accordingly, even in a case where there is no base image signal and the first video synchronization signal 13*a* cannot be obtained from the base image signal, it is possible to continuously output overlay images by the use of, as the video synchronization signal 1*d*, the second synchronization signal 14*a* prepared in advance.

In a case where the circuit for detecting the absence of base image 11 serving as the base image presence or absence decision unit decides the absence of a base image, the image compositing apparatus according to this preferred embodiment outputs a pre-stored image as the background image 7*a* in place of the base image.

Therefore, in a case where there is no base image signal, the background image 7*a* pre-stored in the delay circuit 12 is output in place of a base image, which enables to display, for example, an image including the information such as a color, character, diagram, and the like indicating the absence of a base image signal, in the background of an overlay image.

While the invention has been shown and described in detail, the foregoing description is in all aspects illustrative and not restrictive. It is therefore understood that numerous modifications and variations can be devised without departing from the scope of the invention.

What is claimed is:

1. An image compositing apparatus that produces a composite image by superimposing one or more overlay images on respective areas of chromakey color on a base image if an image signal comprising said base image is present, or outputting the overlay image on an area corresponding to a stored position and size information, the base image consisting of a chromakey color portion and a portion which is not said chromakey color portion, the image compositing apparatus comprising:
   a storage device that stores information of the position and size of an area in which said overlay image is displayed;
   a base image input terminal configured to receive said image signal comprising said base image; and
   a processor configured to execute a process including:
      changing the position and size of each of said one or more overlay images in accordance with the information of said storage device;
      determining whether no image signal is received by said base image input terminal in order to determine whether said image signal comprising said base image is present or absent as an input to the image compositing apparatus;
      when said image signal is determined to be present, deciding said chromakey color portion and said portion which is not said chromakey color portion, respectively, of said base image, at respective areas of said base image decided to be the chromakey color portion, outputting said one or more overlay images according to the changed position and size, and at the area of said base image that is decided to be the portion which is not said chromakey color portion, outputting said base image; and when said image signal, and both said chromakey color portion and said portion which is not said chromakey color portion of said base image, are determined to be absent by virtue of determining that no image signal is received by said base image input terminal, outputting said one or more overlay images according to the changed position and size.

2. The image compositing apparatus according to claim 1, wherein in case said image signal is determined to be absent, said image compositing apparatus outputs said one or more overlay images with the use of a video synchronization signal prepared in advance in place of a video synchronization signal obtained from a signal of said base image.

3. The image compositing apparatus according to claim 1, wherein in case said image signal is determined to be absent, said image compositing apparatus outputs a pre-stored image in place of said base image.

4. The image compositing apparatus according to claim 2, wherein in case said image signal is determined to be absent, said image compositing apparatus outputs a pre-stored image in place of said base image.

5. An image compositing method that is performed by an image compositing apparatus and produces a composite image by superimposing one or more overlay images on respective areas of chromakey color on a base image if an image signal comprising said base image is present, or outputting the overlay image on an area corresponding to a stored position and size information, the base image consisting of a chromakey color portion and a portion which is not said chromakey color portion, said image compositing apparatus including a base image input terminal configured to receive said image signal comprising said base image, the image compositing method comprising:

storing the position and size of an area in which said overlay image is displayed;

changing the position and size of each of said one or more overlay images in accordance with the stored position and size information;

determining whether no image signal is received by said base image input terminal whether said image signal comprising said base image is present or absent as an input to the image compositing apparatus; and when said image signal is determined to be present as an input, deciding said chromakey color portion and said portion which is not said chromakey color portion, respectively, of said base image, at respective areas of the base image decided to be the chromakey color portion of the base image, outputting said one or more overlay images according to the changed position and size, and at the area of the base image that is decided to be the portion which is not said chromakey color portion, outputting said base image; and when said image signal, and both said chromakey color portion and said portion which is not said chromakey color portion of said base image, are determined to be absent by virtue of determining that no image signal is received by said base image input terminal, outputting said one or more overlay images according to the changed position and size.

6. The image compositing method according to claim 5, wherein in the case where said image signal is determined to be absent, said one or more overlay images are outputted with the use of a video synchronization signal prepared in advance in place of a video synchronization signal obtained from a signal of said base image.

7. The image compositing method according to claim 5, wherein in case said image signal is determined to be absent, a pre-stored image is outputted in place of said base image.

8. The image compositing method according to claim 6, wherein in case said image signal is determined to be absent, said image compositing apparatus outputs a pre-stored image in place of said base image.

* * * * *